United States Patent Office 2,839,516
Patented June 17, 1958

2,839,516

PREPARATION OF POLYVINYLAMINE

Cyrus A. Weisgerber, Chadds Ford, Pa., assignor to Hercules Powder Company, Wilmington, Del., a corporation of Delaware No Drawing. Application December 16, 1954
Serial No. 475,819

7 Claims. (Cl. 260—88.3)

This invention relates to an improved process for the preparation of polyvinylamine and/or salts of polyvinylamine.

It is well known that polyvinylamine can be prepared by the hydrazinolysis of poly-N-vinylphthalimide. However, because hydrazine is a relatively extensive chemical, this method of preparation of polyvinylamine is not commercially feasible and is primarily of interest only for laboratory work. It is also known that the action of acids and alkalies on poly-N-vinylphthalimide or poly-N-vinylsuccinimide does not produce polyvinylamine but rather an amphoteric polymer containing both amine and carboxyl groups as well as unhydrolyzed imide groups. Moreover, the reactions with aqueous acids and alkalies are slow and require rather drastic conditions of temperature and pressure.

It has now been found that a polyvinylamine substantially free of carboxyl and imino groups and comparable in all respects to that produced by the hydrozinolysis of a polyvinylphthalimide can be prepared by the acid hydrolysis of a poly-N-vinyldiglycolimide. In carrying out the process of the invention, a mixture of acid, for example, a mineral acid such as hydrochloric acid, poly-N-vinyldiglycolimide and water, is heated for a period of time sufficient to effect the desired conversion of polymer to the corresponding salt of polyvinylamine whereupon the latter may then be recovered in any suitable manner. The free base, polyvinylamine, can be freed from the salt in any suitable and well-known manner as by treatment with a base. The hydrolysis, though conducted under comparatively mild conditions, is relatively rapid and the conversion of polymer to acid salt quite high, for example, in excess of 80% of that theoretically possible. Moreover, substantially all of the nitrogen present in the polyvinylamine salt is in the form of amino nitrogen.

The poly-N-vinyldiglycolimide may be prepared in any suitable manner such as, for example, via the well-known route using diglycolic anhydride and ethanolamine. It may also be prepared by a series of reactions wherein diglycolic acid is first reacted with ammonia to form N-diglycolimide, the latter then reacted with acetylene to form the N-vinyldiglycolimide, and the N-vinyldiglycolimide then polymerized to form the poly-N-vinyldiglycolimide. The polymer may be used in the form of a crude reaction mixture or alternatively may be separated and purified in any suitable manner.

Having described the invention generally, the following example is given to illustrate a specific embodiment thereof.

EXAMPLE 1

Into a 500-ml. round-bottomed flask fitted with a reflux condenser was placed 150 ml. of concentrated hydrochloric acid and 30.2 g. of poly-N-vinyldiglycolimide. The mixture was heated to reflux. In ten minutes the polymer had dissolved. After 4 hours' refluxing, 100 ml. of water was added and refluxing continued for 2 hours. After standing overnight an additional 100 ml. of water was added and the solution refluxed for about 4 more hours. At the end of this time the solution was poured into methanol. The white hydrochloride that precipitated was filtered and extracted with methanol overnight in a Soxhlet extractor. The weight of dry hydrochloride was 14.3 g., which is 84% conversion of polymer to polyvinylamine hydrochloride.

A sample of the material prepared as above described together with a sample of polyvinylamine hydrochloride prepared by hydrozinolysis of polyvinylphthalimide were each analyzed for percent total N, Van Slyke N and chlorine. The values so found and the corresponding values calculated for $C_2H_6ClN$ are set forth in the table below.

*Table I*

|  | Calculated for $C_2H_6ClN$ | Sample prepared as described above | Sample prepared by hydrazinolysis of polyvinylphthalimide |
|---|---|---|---|
| Total N | 17.64 | 16.0 | 15.0 |
| Van Slyke N | 17.64 | 15.8 | 15.4 |
| Cl | 44.7 | 38.4 | 39.0 |

From the above comparison it will be apparent that the polyvinylamine hydrochloride prepared in accordance with the present invention is essentially the same as that prepared by the hydrolysis of polyvinylphthalimide. Moreover, the hydrolysis is readily carried out under relatively mild conditions of pressure and temperature and for comparatively short periods of time.

The acid hydrolysis is preferably carried out with strong mineral acids such as hydrochloric, hydrobromic, sulfuric, sulfamic, phosphoric, etc., sufficient water for the reaction being added to the reaction mixture as required. Organic acids such as aqueous acetic acid, aqueous trichloracetic acid, aqueous formic acid, and the like, may also be used.

The hydrolysis is preferably carried out at reflux temperatures and at substantially atmospheric pressure. However, if desired, the hydrolysis may be carried out at pressures from about 1 to about 16 atmospheres and at corresponding reflux temperatures.

Methanol is the preferred solvent for use in the precipitation, extraction and leaching steps of the process. However, it is possible to use other solvents for these purposes such as ethanol and acetone.

It will thus be seen that the present invention provides an improved process for the preparation of polyvinylamine. The process is characterized by the ease and rapidity of the hydrolysis reactions involved even under relatively mild conditions of temperature and pressure. The process is also characterized by the high degree of conversion of the starting material and the substantial purity, i. e., freedom from carbonyl and imino groups, of the polyvinylamine product.

While a preferred embodiment of the invention has been disclosed, the invention is not to be construed as limited to the details described except as covered in the following claims.

What I claim and desire to protect by Letters Patent is:

1. A process for preparing a substantially pure polyvinylamine having a primary amino nitrogen content comparable to the primary amino nitrogen content of a polyvinylamine prepared by the hydrazinolysis of a poly-N-vinylphthalimide which comprises subjecting poly-N-vinyldiglycolimide to acid hydrolysis to form a salt of polyvinylamine, and then recovering the polyvinylamine salt from the reaction mixture.

2. A process of preparing a substantially pure polyvinylamine having a primary amino nitrogen content comparable to the primary amino nitrogen content of a polyvinylamine prepared by the hydrazinolysis of a poly-N-vinylphthalimide which comprises heating a mixture of poly-N-vinyldiglycolimide and an acid selected from the group consisting of strong mineral acids, acetic acid, trichloracetic acid, and formic acid, until the poly-N-vinyldiglycolimide is substantially converted to a salt of polyvinylamine, and recovering the latter from the reaction mixture.

3. A process of preparing a substantially pure polyvinylamine having a primary amino nitrogen content comparable to the primary amino nitrogen content of a polyvinylamine prepared by the hydrazinolysis of a poly-N-vinylphthalimide which comprises heating a mixture of poly-N-vinyldiglycolimide, water and an acid selected from the group consisting of strong mineral acids, acetic acid, trichloracetic acid, and formic acid, to reflux temperature at a pressure from about 1 to about 16 atmospheres, continuing the heating until the poly-N-vinyldiglycolimide is substantially converted to a salt of polyvinylamine, precipitating the salt of polyvinylamine in a water-miscible monohydroxy aliphatic alcohol, and separating the precipitate of the salt of the basic polyvinylamine which forms.

4. A process of the type set forth in claim 3 wherein the water-miscible monohydroxy aliphatic alcohol is methanol.

5. A process of the type set forth in claim 4 wherein the precipitate of the salt of the basic polyvinylamine is extracted with methanol.

6. A process of the type set forth in claim 5 wherein basic polyvinylamine is liberated from its salt.

7. A process of preparing a substantially pure polyvinylamine having a primary amino nitrogen content comparable to the primary amino nitrogen content of a polyvinylamine prepared by the hydrazinolysis of a poly-N-vinylphthalimide which comprises heating a mixture of poly-N-vinyldiglycolimide, water, and strong mineral acid to reflux temperature at a pressure from about 1 to about 16 atmospheres, continuing the heating until the poly-N-vinyldiglycolimide is substantially converted to the corresponding polyvinylamine salt, and precipitating the polyvinylamine salt from the reaction mixture by treatment with a solvent.

References Cited in the file of this patent

UNITED STATES PATENTS

| | | |
|---|---|---|
| 2,231,905 | Hanford et al. | Feb. 18, 1941 |
| 2,365,340 | Hanford et al. | Dec. 19, 1944 |
| 2,484,423 | Reynolds et al. | Oct. 11, 1949 |